United States Patent
Dewhirst et al.

(12)

(10) Patent No.: US 6,290,467 B1
(45) Date of Patent: Sep. 18, 2001

(54) CENTRIFUGAL IMPELLER ASSEMBLY

(75) Inventors: Randy E. Dewhirst; Mark W. Harrison, both of Onalaska, WI (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 09/454,938

(22) Filed: Dec. 3, 1999

(51) Int. Cl.$^7$ .............................. B63H 1/28; B64C 11/14

(52) U.S. Cl. ........................................................ 416/244 R

(58) Field of Search ........................... 416/244 R, 245 R, 416/245 A; 415/140

(56) References Cited

U.S. PATENT DOCUMENTS

| | | | |
|---|---|---|---|
| 1,764,706 | * | 6/1930 | Willi ................................. 416/244 R |
| 3,387,768 | * | 6/1968 | Zoehfeld ...................... 416/244 R X |
| 3,572,967 | * | 3/1971 | Schreter et al. .................. 416/244 R |
| 3,612,719 | * | 10/1971 | Nomura ............................ 416/244 R |
| 3,692,422 | * | 9/1972 | Girardier .......................... 416/244 R |
| 3,805,547 | | 4/1974 | Eber . |
| 3,853,433 | | 12/1974 | Roberts et al. . |
| 4,257,744 | | 3/1981 | Watson ............................. 416/244 R |
| 5,503,521 | * | 4/1996 | Capon .......................... 416/244 R X |

FOREIGN PATENT DOCUMENTS

2253852 * 12/1973 (DE) .............................. 416/244 R

* cited by examiner

*Primary Examiner*—John E. Ryznic
(74) *Attorney, Agent, or Firm*—William J. Beres; William O'Driscoll

(57) ABSTRACT

A impeller shaft assembly is disclosed for use in a refrigerant compressor, and more particularly in a commercial high-speed centrifugal impeller shaft configuration. The impeller shaft assembly includes a contoured spacer body. The contoured spacer body includes a front face, a rear face, a recessed spring bearing surface in its rear face, and a spring spacing abutment including a shoulder that is seated against a protective washer. The contoured spacer body functions to prevent the headed front end of a fastener from coming into direct contact with a spring assembly and protective washer. Consequently, the spring assembly and protective washer are not sized to correspond to the cross-section area of the headed front end as disclosed in the prior art. Instead, the protective washer and spring assembly are sized to fit the rear face of the contoured spacer body, which in turn is sized to fit the front face of a first stage impeller. The contoured spacer body ensures that the clamp load is dissipated across the front face of the first stage impeller. The contoured spacer body also provides greater protection to the first stage impeller during installation and maintenance. In another embodiment, the contoured spacer body and headed front head are combined to make a contoured front end.

33 Claims, 7 Drawing Sheets

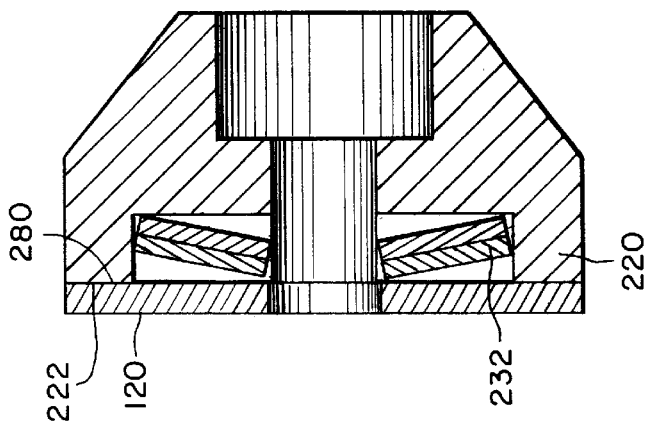
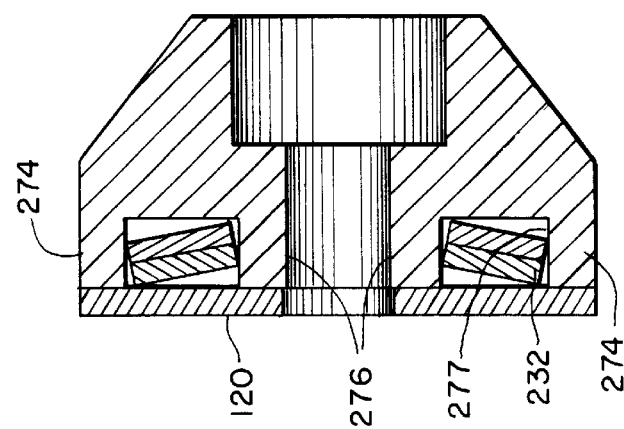
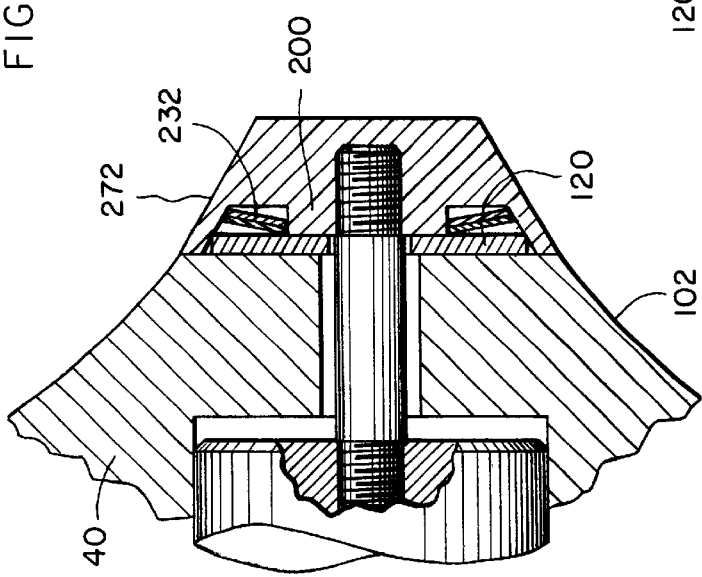

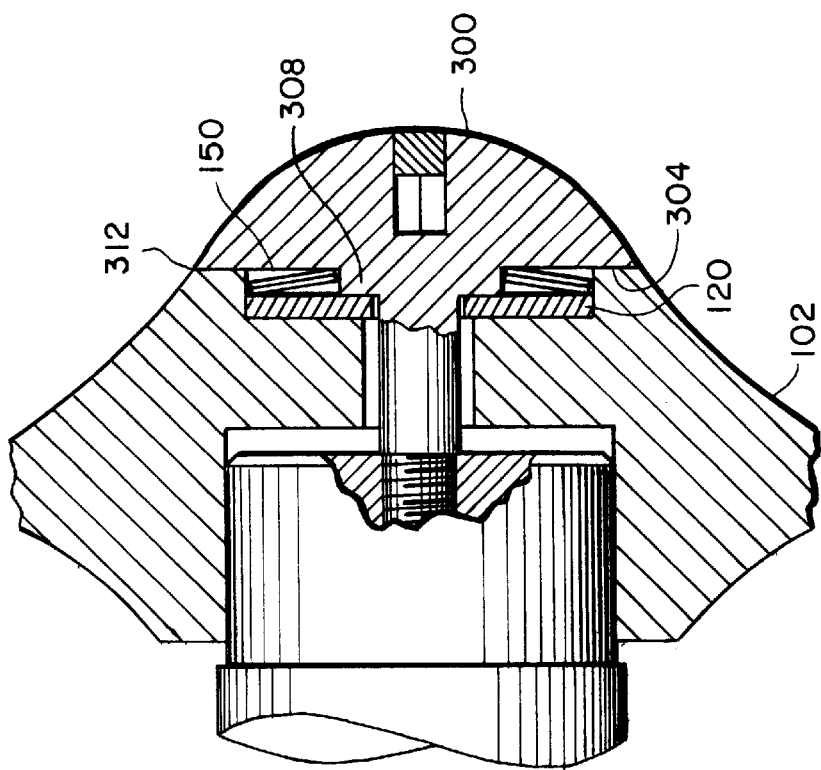
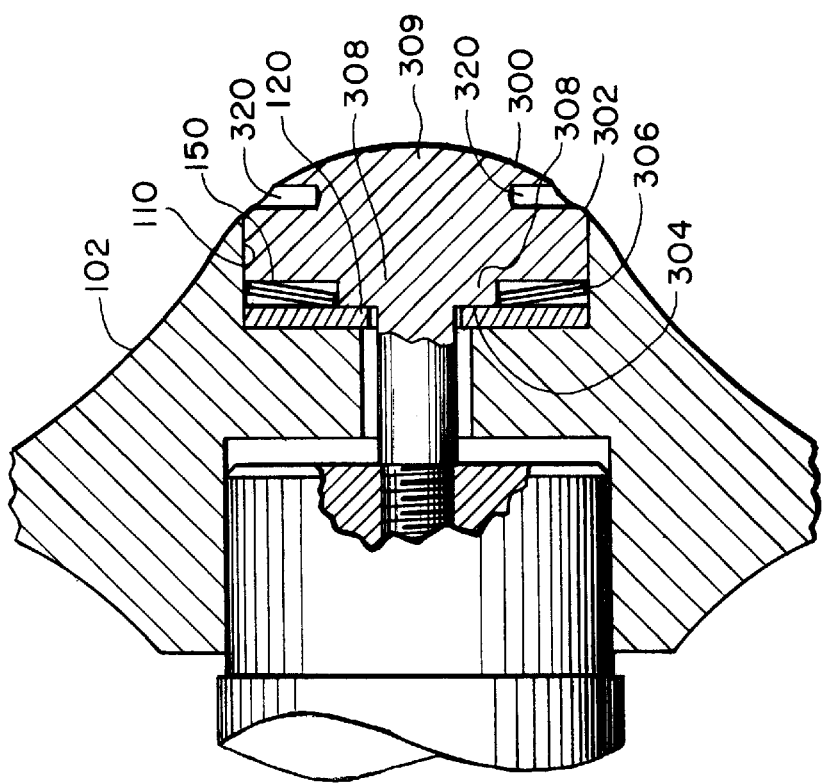

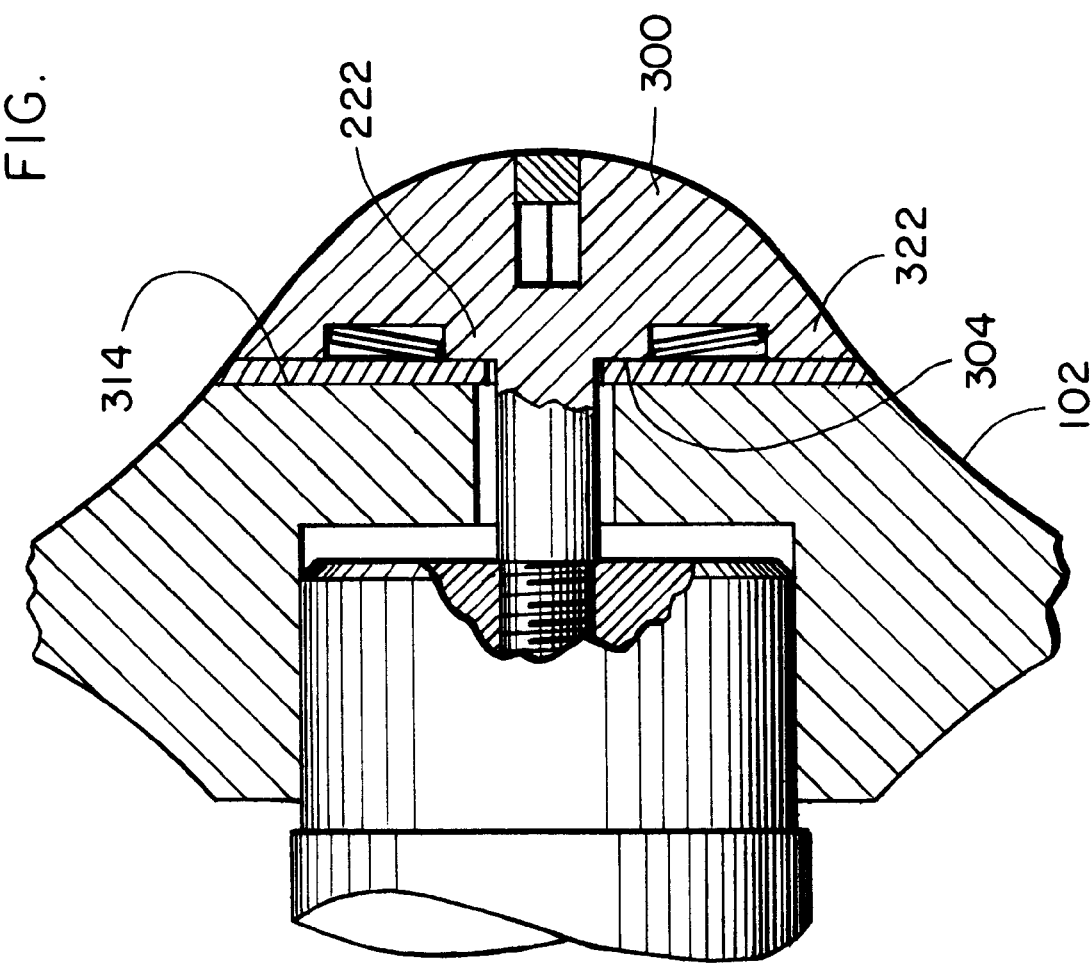

CENTRIFUGAL IMPELLER ASSEMBLY

BACKGROUND OF THE INVENTION

This invention relates to centrifugal gas compressors and, more particularly, to an impeller and shaft assembly used in a high-speed gas compressor in a refrigeration plant or other chiller.

Centrifugal gas compressors have one or more impellers rotated in a cavity for compressing a gas, such as refrigerant vapor. The one or more impellers are mounted on a pinion shaft that is turned by a motor. In centrifugal gas compressors, it is important that the impellers and pinion shaft mounting arrangements are simple and efficient to manufacture, install and operate. In particular, overly complex attachment arrangements involving the machining of complementary grooves and threads in male and female parts pose a greater burden on highly skilled machinists, a resource that is both finite and costly. More particularly, such arrangements are more likely to be damaged during transport, installation and normal running of the compressor.

U.S. Pat. No. 4,257,744 describes an impeller and shaft assembly that includes a cap screw, a Belleville washer or spring, a deformable socket machined into the rear of an impeller, a drive shaft with a frusto-conical shaped extremity, and a steel washer. The impeller has an axial bore extending through its center and a counterbored recess at its front. The frusto-conical shaped extremity includes axially extended grooves that are circumferentially spaced and alternate with intervening lands. A high torque applied to the cap screw results in plastic deformation of the lining of the socket in the rear of the impeller.

The manufacture of the frusto-conical shaped extremity is complex and adds to the cost of the impeller and shaft assembly. In addition, the counterbored recess is sized to accommodate the cap screw. As a result, the protective steel washer and single spring are both sized to correspond to the cross-section area of the counterbored recess and screw cap. Thus, the torque results in a clamping force being directly transmitted from the cap screw, without dissipation, through the single Belleville washer and steel washer. This arrangement may damage the single Belleville washer and cause stress fractures in the front face of the impeller immediately around the counterbored recess, necessitating the costly replacement of the entire impeller. Thus, there is a need for a simple impeller and shaft assembly that minimizes the risk of damage to the front face of the impeller necessitating the costly replacement of the entire impeller.

Maintenance personnel may use an ordinary wrench when a torque wrench is more appropriate. Dramatic over or under-torquing of pinion shafts in centrifugal impeller configurations leads to increased maintenance and downtime costs. An impeller assembly that is less vulnerable to such problems is needed.

Additionally, cap screws increase the diameter of the impeller eye. The impeller eye is the terminal area on the cap screw end which is located radially inward of the impeller contour.

Other factors are the effect of thermal expansion of the aluminum impeller versus the steel drive shaft, and the fretting between the parts.

BRIEF SUMMARY OF THE INVENTION

Accordingly, an object of this invention is to provide a simpler and improved impeller and shaft assembly.

Another object is to provide an impeller and shaft assembly that employs an arrangement that more effectively dissipates the clamping load.

Yet another object is to avoid stress fractures in the front face of the impeller leading to replacement of the entire impeller.

A further object is to provide an impeller assembly that is less prone to damage resulting from failure to use a torque wrench.

It is an object, feature and advantage of the present invention to expand the impeller contour into the area of the impeller eye. It is a further object of the invention to provide a contour to the fastener or washer located in that eye area. It is still a further object, advantage and feature of the invention that the contour added in the area of the impeller eye should be continuous with the contour of the impeller itself.

It is an object, feature and advantage of the present invention to provide a collapsible washer that counteracts the effects of thermal expansion between the aluminum impeller versus a steel drive shaft.

It is a further object, feature and advantage of the present invention to reduce fretting between the components of a high speed impeller, shaft and fasteners.

At least one of these objects is addressed, in whole or in part, by the present invention. The invention is a rotatable impeller assembly for a refrigerant compressor. The assembly includes an impeller, a protective washer, a contoured spacer body, and at least one spring. (In this specification, an element introduced with an article "a," "an," or "the," such as "a spring" or "the bore," should be read to include one or more of the element.)

The impeller has an axial bore through it, a front face intersecting with the axial bore, and a rear face that is adapted to fit the driving end of a rotatable shaft. The protective washer is seated against the front face of the impeller. The rear face of the protective washer is seated against the front face of the impeller. The protective washer has an aperture registered with the axial bore. The contoured spacer body has a front face, a rear face, a recessed spring bearing surface in its rear face, a spring spacing abutment positioned to seat against the protective washer, and a central bore. At least one spring is seated between the protective washer and the spring bearing surface to provide a spacer assembly. The protective washer is used to keep the at least one spring from damaging the impeller.

A fastener (such as a bolt), including a headed front end and a rear end, is positioned through the axial and central bores. The rear end of the fastener is connected to the rotatable shaft. The headed front end of the fastener is seated against the front face of the contoured spacer body to provide a clamping load. The front face of the contoured spacer body may further comprise a recess sized to accommodate the headed front end of the fastener.

An advantage of this invention is that the cross-section area of the headed front end of the fastener does not govern the cross-section area of the protective washer and the at least one spring. Instead, the protective washer and the spring are sized to correspond to the much larger cross-section area of the rear face of the contoured spacer body, which itself closely matches the cross-section area of the front face of the impeller. Hence, the clamping load, after bolt tightening, is dissipated over a relatively large area of the front face of the impeller.

This arrangement has two immediate and very advantageous consequences. First, the front face of the impeller is less likely to suffer stress fractures. Second, even in the event that the clamping load causes stress fractures in the region immediately around the headed front end, such damage will only require the replacement of the contoured spacer body rather than the replacement of the impeller.

Another advantage of this invention is that the use of a collapsible washer counteracts the effects of the thermal expansion caused by the difference in materials between an aluminum impeller and a steel drive shaft. The use of the collapsible washer also reduces fretting between the parts since the washer absorbs some of the tension generated in axial directions.

Yet another advantage of the present invention is that the impeller contour is extended closer to the axis of impeller rotation. This is accomplished by modifying the contoured spacer body to extend the impeller contour over the fastener and washer area.

A further advantage of the present arrangement is that a maintenance engineer not using a torque wrench is far less likely to damage the impeller shaft assembly by applying too great a clamping load at the headed front end of the fastener. This is because in one aspect of the invention the contoured spacer body includes a spring spacing abutment positioned to seat against the protective washer. Once the spring spacing abutment comes into contact with the front face of the protective washer, the maintenance engineer will notice that it is suddenly harder to tighten the headed front end. This is a signal to stop tightening and hence avoid grossly over-torquing the impeller shaft assembly.

Yet another advantage is that the impeller shaft assembly is more tolerant to rough treatment. For example, a maintenance engineer who is in the habit of using a hammer or other rough treatment to loosen the fastener is more likely to damage the contoured spacer body rather than the front face of the impeller. Replacing a damaged contoured spacer body is preferable to replacing a damaged impeller.

Alternatively the contoured spacer body and the headed front end of the fastener can be combined to convert the headed front end into a contoured front end. In this aspect of the invention the contoured front end of the fastener would include at least some of the elements of the contoured spacer body and the headed front end. The contoured front end includes a front face, a rear face, a recessed spring bearing surface in its rear face, and a spring spacing abutment positioned to seat against the protective washer. However, the contoured front end does not require a central bore. The at least one spring is seated between the protective washer and the spring bearing surface of the contoured front end to provide a spacer assembly.

The above mentioned and other features of this invention and the manner of obtaining them will become more apparent, and the invention itself will be best understood, by reference to the following drawings taken in conjunction with the accompanying description of preferred embodiments.

BRIEF DESCRIPTION OF THE SEVERAL VIEWS OF THE DRAWING

FIG. 6 is an enlarged section in isolation, of the contoured spacer body and Belleville springs employed in another alternative embodiment of the present invention.

FIG. 7 is an enlarged section, in isolation, of the contoured spacer body and pair of Belleville springs employed in another preferred embodiment of the invention.

FIG. 8 is an enlarged section, in isolation, of the contoured spacer body employed in yet another preferred embodiment of the invention.

FIG. 9 is a longitudinal section of the impeller and shaft assembly comprising a contoured front end.

FIG. 10 is a longitudinal section of the impeller and shaft assembly comprising a contoured front end according to another preferred embodiment of the invention.

FIG. 11 is a longitudinal section of the impeller and shaft assembly comprising a contoured front end according to yet another preferred embodiment of the invention.

DETAILED DESCRIPTION OF THE INVENTION

While the invention will be described in connection with one or more embodiments, it will be understood that the invention is not limited to those embodiments. On the contrary, the invention includes all alternatives, modifications, and equivalents as may be included within the spirit and scope of the appended claims.

Figure 1:
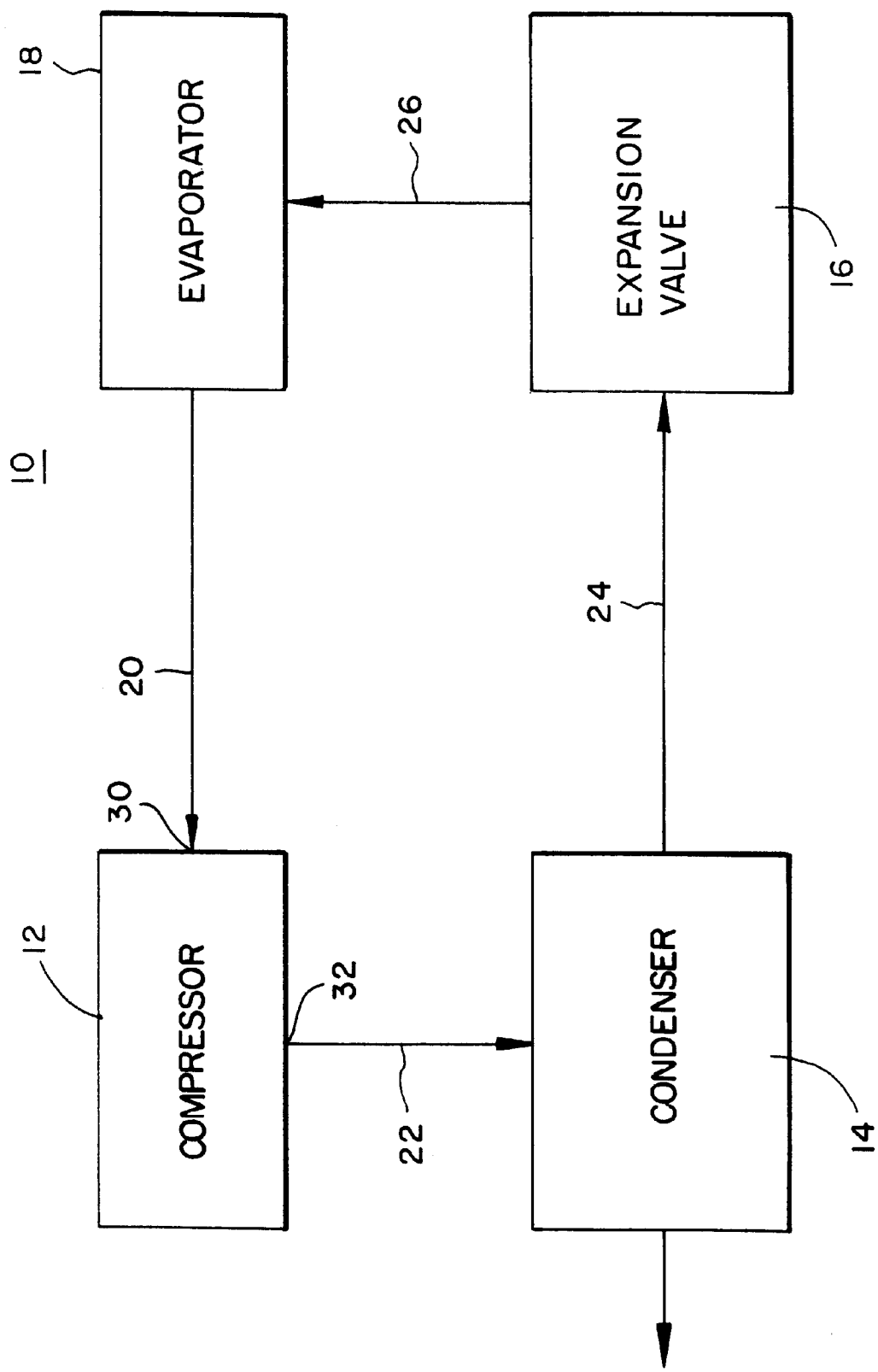
FIG. 1 is a block diagram of a chiller showing the major components and the flow of the refrigerant through the chiller.

FIG. 1 schematically shows a mechanical chiller 10 including a compressor 12, a heat exchanger such as a condenser 14, an expansion device such as an expansion valve 16, and a heat exchanger such as an evaporator 18. These components are connected to form a refrigerant circuit by refrigerant conduits 20, 22, 24 and 26. Refrigerant gas enters the compressor 12 from the conduit 20 and is compressed in the compressor 12, thus raising its temperature. The compressed gas from the compressor 12 enters the condenser 14 via the conduit 22. In the condenser 14, the hot, compressed gas is condensed into liquid form and contacted with a heat sink, such as ambient air, ground water, or another cooler medium, to remove heat from the condensing refrigerant. The condensed refrigerant passes through the conduit 24 and through an expansion valve 16. The expansion valve 16 allows a limited quantity of refrigerant to enter the evaporator 18, while maintaining the pressure difference between the condenser 14 (at higher pressure) and the evaporator 18 (at lower pressure). The refrigerant entering the evaporator 18 evaporates after contacting a heat load, such as the refrigerator interior or ventilation air that is to be cooled, thus absorbing heat from the heat load. The refrigerant vapor leaves the evaporator 18 via the conduit 20, returning to the compressor 12 to repeat the cycle.

Figure 2:
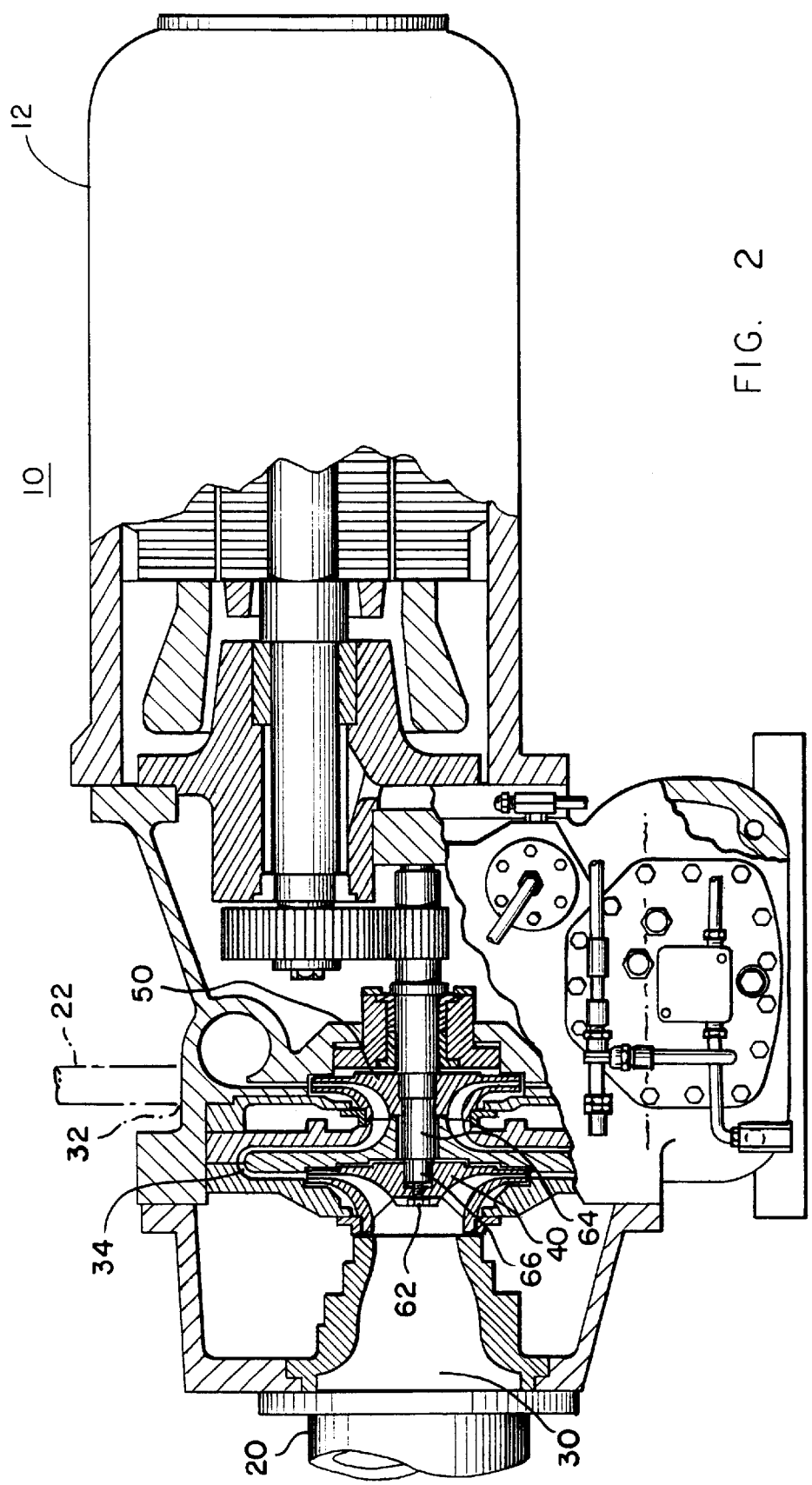
FIG. 2 is a side elevation, cut away to show some of the interior features, of a refrigeration compressor. The refrigerant inlet and outlet are also shown.
Figure 3:
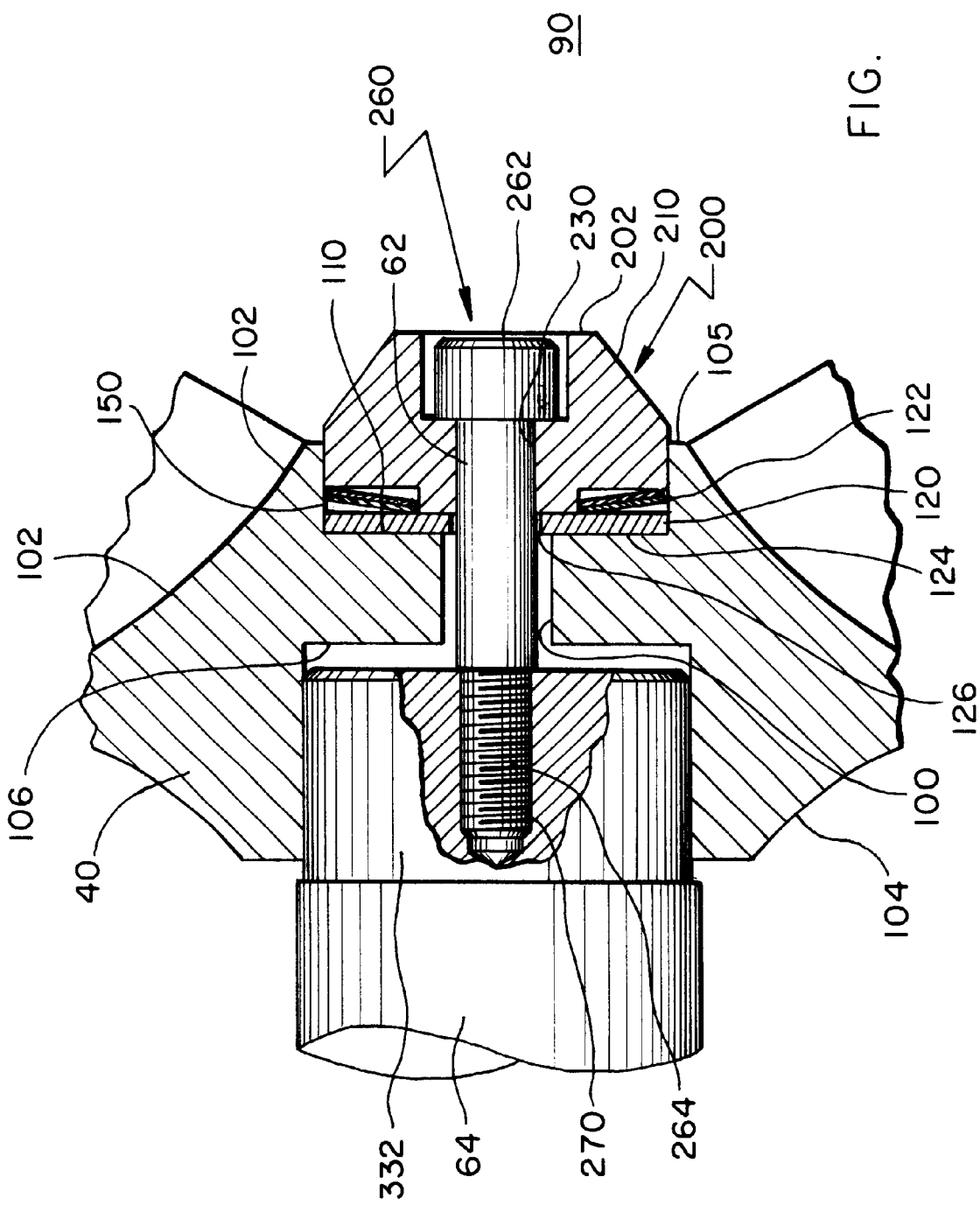
FIG. 3 is a longitudinal section of the impeller and shaft assembly comprising a contoured spacer body according to one aspect of the invention.

Now refer to FIGS. 2 and 3, and specifically to the interior of a centrifugal compressor 12. The compressor 12 includes an impeller assembly including impellers 40, 50 mounted on a rotatable shaft 64. The compressor 12 has a gas inlet 30, a gas outlet 32, and internal passages 34 directing refrigerant gas from the inlet 30, into and through the first stage impeller 40, the second stage impeller 50, and to the outlet 32. The rear end 264 of a fastener 62 such as a bolt (or other device allowing radial rotation while providing axial clamping force) is connected to the rotatable shaft 64 to removably attach the impeller 40 to the rotatable shaft 64. Although the preferred embodiment of this invention is shown as a gear drive centrifugal compressor, the impeller assembly is generally applicable to all centrifugal compressors as well as to other compressors having an impeller 40 mounted on a terminal end 66 of a rotatable shaft such as rotatable shaft 64. Exemplary centrifugal compressors are sold under the registered trademark CenTraVac by The Trane Company, a Division of American Standard Inc. having a principal place of business in La Crosse, Wis. Exemplary centrifugal compressors are shown in commonly assigned U.S. Pat. No. 3,805,547 to Eber and U.S. Pat. No. 3,853,433 to Roberts et al., both of which are incorporated by reference herein.

Referring to FIGS. 2 and 3, a first stage impeller and shaft assembly 90 including the first stage impeller 40 depicting an aspect of this invention is disclosed. The impeller 40 has an axial bore 100 through it, a front face 102 intersecting with the axial bore 100, and a rear face 104 that is adapted to fit the driving end 66 of the rotatable shaft 64. FIG. 3 does not show the details of the connection between the impeller 40 and the shaft 64, which can be conventional. For two examples, either a conventional splined joint or the three-lobed connection described in co-pending U.S. Ser. No. 09/204,867, filed by the present assignee on Dec. 3, 1998 can be used.

The front face 102 of the impeller 40 is truncated at an end 105 and optionally has a recess 110 to accommodate a contoured spacer body 200, a protective washer 120 and an expansor such as a spacer assembly 150. For purposes of this application, a contoured spacer body is a device having an external surface which is aerodynamically contoured and having an internal portion acting as a spacer. The spacer assembly 150 provides a known resistance when compressed.

The protective washer 120, preferably a hardened steel washer, has a front face 122 and a rear face 124. The rear face 124 is seated against the front face 102 (the recess 110 if present) of the impeller 40. The protective washer 120 has an aperture 126 registered with the axial bore 100.

Figure 4:
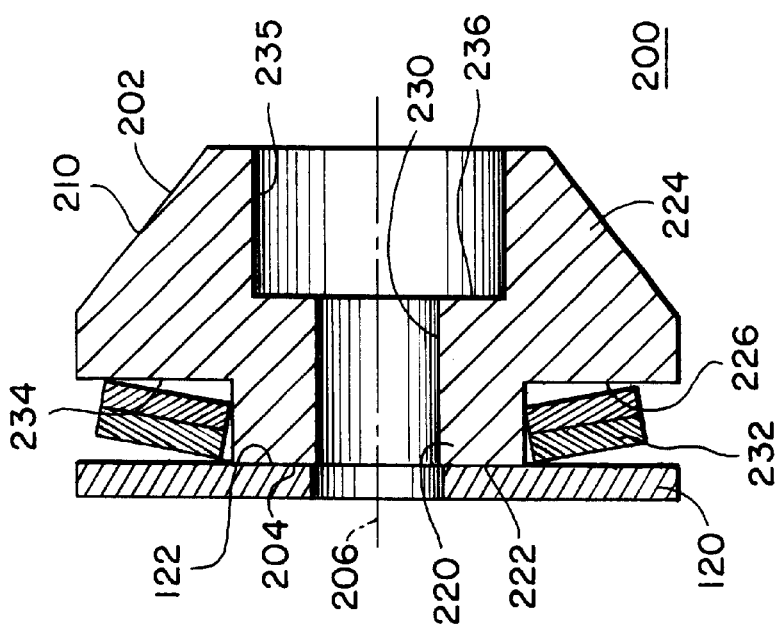
FIG. 4 is an enlarged section, in isolation, of the contoured spacer body as illustrated in FIG. 3.

Referring to FIGS. 3 and 4, the contoured spacer body 200 includes a front surface 202 and a rear surface 204. The contoured spacer body 200 is symmetrical about an axis 206, and the front surface 202 includes a contoured surface 210 at an angle or a curve relative to the axis 206. The rear surface 204 includes a spring spacing abutment 220 including a washer contact surface 222 at the end of the abutment 220. The spring spacing abutment 220 is axially dimensioned relative to the axis 206 so that the spacer assembly 150 deflects at a desired amount. The contoured spacer body 200 includes a center portion 224 having a rear recess 226 arranged in the rear surface 204 about the spring spacing abutment 220. A central bore 230 runs through the center portion 224 symmetrical about the axis 206. The washer contact surface 222 engages the protective washer 120. The recess 226 provides a spring bearing surface 234 for engagement with the spacer assembly 150. The front surface 202 of the contoured spacer body 200 preferably includes a recess 235 and a forward facing shoulder 236 in the recess 235. At least one tension providing device such as a spring 232, which in the illustrated embodiment is a Belleville spring (though another type of spring, or a lock washer, or a compressible gasket or washer can be used instead), is seated between the protective washer 120 and the spring bearing surface 234 to provide the spacer assembly 150.

The fastener 62, including a headed front end 260, a front face 262 and a rear end 264, is positioned through the axial bore 100, the aperture 126, and the central bore 230. The rear end 264 of the fastener 62 is connected to the rotatable shaft 64 (here, the rear end 264 is threaded into a cavity 270 in the shaft 64), and the headed front end 260 is seated against the front surface 202 of the contoured spacer body 200, preferably in the recess 234 and against the shoulder 236, to provide a clamping load.

After torquing the fastener 62, the spacer assembly 150 collapses to about 75% of its maximum deflection. The abutment 220 of the contoured spacer body 200 is seated against the protective washer 120 and is spaced by the depth of the spring spacing abutment 220 to control the deflection of the springs 232 in the spacer assembly 150. At 75% maximum deflection, the clamp load will exceed the axial thrust load imposed upon the impeller 40.

FIG. 4 is an enlarged isolated side elevational view, in section, of the contoured spacer body 200 including the spring spacing abutment 220 as positioned to seat against the protective washer 120 (as shown in FIG. 3). In this embodiment, the surface 222 comes into contact with the front face 122 of the protective washer 120. At least one spring 232 is sized to fit in the recessed pocket 226 formed between the contoured spacer body 200 and the protective washer 120. The protective washer 120 is used to keep the at least one spring 232 from damaging the impeller 40. A skilled mechanic would slack off slightly to avoid over-torquing the impeller shaft assembly in response to the surface 222 seating hard against the protective washer 120.

The front surface 202 of the contoured spacer body 200 can desirably be continuous from the front face 102 of the impeller 40 to the central bore 230. The front surface 202 of the contoured washer 200 optionally has a recess 235 to accommodate the headed front end 260 of the fastener 62. The recess 235 in the front surface 202 of the contoured spacer body 200 can be sized to ensure that the front face 262 of the headed front end 260 is seated flush across the central bore 230 in order to make a substantially continuous surface (shown in FIG. 3). A substantially continuous surface across the front surface 202 of the contoured spacer body 200 provides improved refrigerant flow during normal operation.

In one aspect of this embodiment (as depicted in FIG. 3) the truncated end 105 in the front face 102 of the impeller 40 is sized to accommodate the protective washer 120, the spacer assembly 150 and the contoured spacer body 200. In this embodiment of the invention, the rear face 124 of the protective washer 120 seats against the recess 110 in the front face 102 of the impeller 40.

Figure 5:
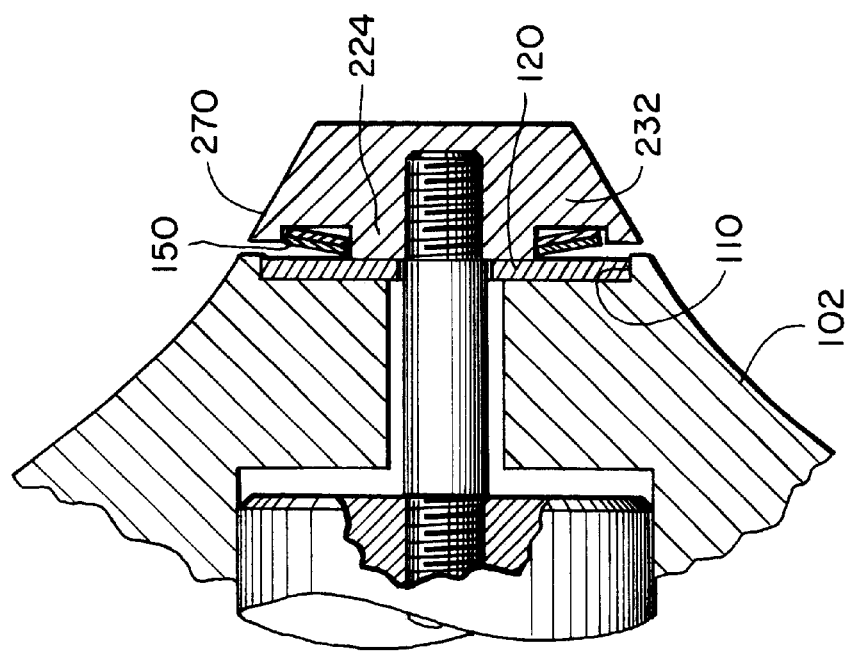
FIG. 5 is an enlarged section, in isolation, of the contoured spacer body and Belleville springs employed in an alternative embodiment of the invention.

In an alternative embodiment shown in FIG. 5, the body 224 of the contoured spacer body 200 has an aerodynamic portion 270 extending slightly around the spring spacing abutment 220 but not contacting either the impeller 40 or the protective washer 120. In this manner, the front face 102 of the impeller 40 need only provide a recess 110 sized to accommodate the protective washer 120. One advantage of this embodiment is that the front face 102 of the impeller 40 around such a recess would be less vulnerable to stress fractures.

In another embodiment shown in FIG. 6, the contoured spacer body 200 has an aerodynamic portion 272 which extends around the spring 232 and the protective washer 120 to make contact with the front face 102 of the impeller 40.

In still another embodiment, the spring spacing abutment 220 is spaced radially outwardly so that the surface 222 seats against an outer edge 280 of the protective washer 120 (FIG. 7).

In yet another embodiment, the rear surface 204 of the contoured spacer body 200 provides two shoulder surfaces 274 and 276 (FIG. 8) including an outer shoulder 274 spaced radially outwardly and an inner shoulder 276 spaced radially inwardly. In this embodiment each shoulder, 274 and 276, seats against the washer 120 to provide a pocket 277 to accommodate the at least one spring 232.

Referring to FIG. 9, the contoured spacer body 200 (not shown in FIG. 9) and the headed front end 260 (not shown in FIG. 9) of the fastener 62 are combined to convert the headed front end 260 into a domed front end 300 of the fastener 62. In this aspect of the invention, the domed front end 300 has a front face 302, a rear face 304, a recessed spring bearing surface 306 in its rear face 304, and a spring spacing abutment 308 positioned to seat against the protective washer 120. In this arrangement, the spacer assembly 150 is seated between the protective washer 120 and the spring bearing surface 306.

As in FIG. 3, the front face 102 of the impeller 40 may comprise a recess 110 in order to accommodate the protective washer 120. The rear face 304 of the domed front end 300 (including the surface 306) can be sized to correspond to the cross section area of the truncated end 105 of the impeller 40 (or to the forward facing area of the recess 110). In this arrangement the rear face 124 (and by default, the front face 122) of the protective washer is sized to correspond to the cross-section area of the truncated end 105 of the impeller 40 (or the forward facing area of the recess 110). Thus, the clamping force is transmitted from the domed front end 300 and through the relatively large surface area of the protective washer 120. Hence, large torquing may be applied without causing stress fractures in the front face 102 of the impeller 40 or the rear face 304 of the domed front end 300.

The fastener's ability to carry more torque results in higher energy yield. In addition, the front face 302 of the domed front end 300 provides a continuous aerodynamic surface 309 across the front face 102 of the impeller 40. Compressors fitted with a contoured front end will result in higher speeds and higher work rates and a concomitant decrease in compressor size.

The front face 302 of the domed front end 300 may be designed with indents or holes 320 to allow a suitable tool bit to attach to the aerodynamic surface 309. This tool bit in turn attaches to a suitable torque wrench. Alternatively, the tool bit might form part of a torquing tool. This would ensure that appropriate tools are used in the installation and removal of the impeller and shaft assembly thus decreasing the likelihood of damage to the impeller and shaft assembly.

FIG. 10 schematically shows a different aspect of the arrangement disclosed in FIG. 9. In this aspect of the invention, the rear face 304 of the domed front end 300 makes contact with the front face 102 of the impeller 40 at a shoulder area 312 of the domed front end 300. The recess 110 in the front face 102 of the impeller 40 is less pronounced compared to that disclosed in FIG. 9.

In another aspect of the invention, the front face 102 of the impeller 40 has a truncated end 314 which lacks the recess 110 and is essentially flat as shown in FIG. 11. In this embodiment of the invention, the protective washer 120 is sized to correspond more closed to the cross section area of the truncated end 314 of the impeller 40. The protective washer 120 preferably includes a contoured, radially outward end 318 having an aerodynamic contour matching that of the domed front end 300 and the front face 102. The domed front end 300 has an additional shoulder 322. The comparatively large cross section area of the rear face 304 in contact with the protective washer 120 ensures maximum dissipation of the clamping load.

While the invention is described above in connection with preferred or illustrative embodiments and examples, they are not intended to be exhaustive or limiting of the invention. Rather, the invention is intended to cover all alternatives, modifications and equivalents included within its spirit and scope of the invention, as defined by the appended claims.

What is claimed is:

1. A refrigerant compressor rotatable impeller assembly comprising:
   a rotatable shaft having a driving end;
   an impeller having an axial bore, and a front face intersecting with said axial bore, wherein the impeller is operably engaged with the driving end of the rotatable shaft;
   a spacer body comprising a front face, a rear face, a recessed spring bearing surface in the rear face and a central bore;
   a fastener positioned through said axial and central bore, said fastener having a rear end to connect to said rotatable shaft and a headed front end to seat against the front face of said spacer body to provide a clamping load.

2. The invention of claim 1 wherein the front face of said contoured spacer body is continuously contoured from the front face of said impeller to said central bore.

3. The invention of claim 2 further including a protective washer seated against said front face and having an aperture registered with said axial bore and wherein the spacer body includes a spring spacing abutment positioned to seat against said protective washer.

4. The invention of claim 3 further including a tension providing device seated between said protective washer and said spring bearing surface wherein said tension providing device includes at least one spring.

5. The invention of claim 4 wherein said at least one spring is collapsed to a preferred percentage of its maximum deflection when said spring spacing abutment is seated against said protective washer.

6. The invention of claim 5 wherein said at least one spring is a Belleville spring and the preferred percentage is about 75%.

7. The invention of claim 1 wherein said rear face of said spacer body further comprises at least one shoulder.

8. The invention of claim 1 wherein said headed front end comprises a front face at least substantially spanning said central bore to make a substantially continuous surface.

9. The invention of claim 3 wherein the front face of said impeller further comprises a recess sized to accommodate said protective washer.

10. The invention of claim 3 wherein the front face of said impeller further comprises a recess to accommodate said protective washer, and at least one spring.

11. The invention of claim 1 wherein said front face of said contoured spacer body further comprises a recess sized to accommodate said headed front end.

12. The invention of claim 1 wherein said contoured spacer body and said headed front end are combined to form a contoured front end.

13. An impeller and shaft assembly system for a centrifugal compressor comprising:
   a rotatable shaft;
   an impeller operably engaged with the rotatable shaft and having an aerodynamically contoured front face and an end surface at a distal end of the front face;
   a contoured spacer body positioned at the impeller end and having a contour matching the contour face of the impeller, the contoured spacer body including a recess;

a fastener operatively engaged with the contoured spacer body and the rotatable shaft so as to maintain the impeller and rotatable shaft in connection; and an expansor with a known axial expansive force and providing a known axial force between the contoured spacer body and the impeller.

14. The system of claim 13 further including a protective washer in the recess between the impeller and the contoured spacer body.

15. The system of claim 14 wherein the contoured spacer body, the protective washer, and the impeller each have a radial bore, all in alignment.

16. The system of claim 15 wherein the fastener is a pinion bolt operably inserted through the bores of the contoured spacer body, protective washer and impeller to engage an end of the rotatable shaft.

17. The system of claim 16 wherein the impeller has blades.

18. The system of claim 17 wherein the fastener has a head, the contoured spacer body has a second recess, and wherein the head of the fastener is operably engaged with the second recess.

19. The system of claim 18 wherein the contoured spacer body has an abutment located proximal the fastener and sized to control the load on the expansor.

20. The system of claim 19 wherein the expansor comprising a Belleville spring.

21. The system of claim 18 wherein the contoured spacer body has a first shoulder radially spaced from the fastener.

22. The system of claim 21 wherein the first shoulder engages the end surface of the impeller.

23. The system of claim 21 wherein the first shoulder engages the protective washer.

24. The system of claim 23 further including a second shoulder located proximal the fastener and engaging the protective washer.

25. An impeller and shaft assembly for a centrifugal compressor comprising:

a rotatable shaft;

an impeller having a rear face operably engaged with the rotatable shaft, an aerodynamically contoured front face, and an end surface at a distal end of the front face;

a protective washer having an inner surface engaging the end surface and having an outer surface;

a fastener operatively engaged with the rotatable shaft so as to maintain the impeller and rotatable shaft in connection, the fastener including a domed front end having a rear surface engaging the outer surface of the protective washer.

26. The system of claim 25 including an expansor with a known axial expansive force and providing a known axial force between the impeller and the domed front end.

27. The system of claim 26 the protective washer and the impeller each having a radial bore in alignment, and the fastener a including fastener portion passing through the radial bore, wherein the domed front end has an abutment located proximal the shaft of the fastener and sized to control the load on the expansor.

28. The system of claim 27, the impeller having a recess, the end surface being located in the recess and the recess containing the protective washer, the expansor, and the domed front end.

29. The system of claim 27 the impeller containing a recess, the recess containing the protective washer, the expansor, and the abutment, the domed front end including a rear front face which engages the end surface of the impeller.

30. The system of claim 27 wherein the domed front end includes a first shoulder radially spaced from the abutment and the expansor.

31. The system of claim 27 wherein the expansor is a Bellville spring.

32. The system of claim 27 wherein a front face of the domed front end provides a continuous aerodynamic surface across the front face of the impeller.

33. The system of claim 32 wherein the protective washer includes a radially spaced outer end having an aerodynamic contour.

* * * * *